United States Patent [19]

Skorheim

[11] Patent Number: 5,579,286
[45] Date of Patent: Nov. 26, 1996

[54] QUIET GEOPHYSICAL CONSTRUCTION PRACTICES FOR REDUCED DIAMETER STREAMERS

[75] Inventor: Robert D. Skorheim, Dallas, Tex.

[73] Assignee: Whitehall Corporation, Dallas, Tex.

[21] Appl. No.: 343,673

[22] Filed: Nov. 22, 1994

[51] Int. Cl.⁶ ..................................................... G01V 1/38
[52] U.S. Cl. .............................................................. 367/154
[58] Field of Search .................................. 367/154, 153, 367/130, 106, 20; 181/110

[56] References Cited

U.S. PATENT DOCUMENTS

| | | | |
|---|---|---|---|
| 3,877,033 | 4/1975 | Unz | 367/154 |
| 4,737,937 | 4/1988 | Keckler et al. | 367/154 |

*Primary Examiner*—Daniel T. Pihulic
*Attorney, Agent, or Firm*—Hitt Chwang & Gaines, P.C.

[57] ABSTRACT

A hydrophone module for a towed hydrophone array. The module comprises: (1) an elongated hydrophone module housing having a desired hydrophone group center associated therewith and (2) a plurality of hydrophone elements located substantially aperiodically along a length of the housing and electrically coupled together in a hydrophone group, the hydrophone group having an actual hydrophone group center proximate the desired hydrophone group center to thereby allow locations of the plurality of hydrophone elements to be altered without dislocating the actual hydrophone group center. Individual hydrophone elements within the group may therefore be moved within the module without disturbing the actual hydrophone group center.

10 Claims, 3 Drawing Sheets

QUIET GEOPHYSICAL CONSTRUCTION PRACTICES FOR REDUCED DIAMETER STREAMERS

CROSS-REFERENCE TO RELATED APPLICATIONS

This application is related to the following U.S. patent applications:

| Serial No. | Title | Inventor(s) | Filing Date |
|---|---|---|---|
| 08/126,057 Now U.S. Pat. No. 5,400,298 | TOWED HYDROPHONE STREAMER WITH DISTRIBUTED ELECTRONICS HOUSINGS | John S. Hepp | 09/23/1993 |
| 08/126,304 | TELEMETRY DATA TRANSMISSION CIRCUIT HAVING SELECTABLE CLOCK SOURCE | Durwood Fletcher | 09/23/1993 |
| 08/126,078 Now U.S. Pat. No. 5,412,621 | ENCAPSULATED HYDROPHONE ELEMENT FOR TOWED HYDROPHONE ARRAY | John S. Hepp | 09/23/1993 |
| 08/125,562 Now Abandoned | TELEMETRY TRANSMISSION PROTOCOL FOR TOWED HYDROPHONE STREAMER | Robert H. Mastin, et al. | 09/23/1993 |
| 08/126,305 Now U.S. Pat. No. 5,367,499 | VIBRATION ISOLATION MODULE FOR TOWED HYDROPHONE STREAMER | Charles L. Morningstar, et al. | 09/23/1993 |
| (WHTL-0005CIP) Now U.S. Pat. No. 5,523,983 | DUAL ROPE VIBRATION ISOLATION MODULE FOR TOWED HYDROPHONE STREAMER | Charles L. Morningstar, et al. | 11/18/1994 |
| 08/126,052 Now U.S. Pat. No. 5,408,442 | HYDROPHONE ELEMENT WITH FILTER CIRCUIT | John S. Hepp | 09/23/1993 |
| 08/126,064 | DATA COLLECTION AND RELAY CIRCUIT FOR TOWED HYDROPHONE ARRAY | Bruce Elliott | 09/23/1993 |

The above-listed applications are commonly assigned with the present invention and are incorporated herein by reference as if reproduced herein in their entirety.

TECHNICAL FIELD OF THE INVENTION

The present invention is directed, in general, to towed hydrophone streamers and, more particularly, to construction practices to minimize acoustic interference in reduced diameter streamers.

BACKGROUND OF THE INVENTION

It is now common practice to explore the oceans of the earth for deposits of oil, gas and other valuable minerals by seismic techniques in which an exploration vessel imparts an acoustic wave into the water, typically by use of a compressed air "gun." The acoustic wave travels downwardly into the sea bed and is reflected at the interfaces between layers of materials having varying acoustic impedances. The wave travels back upwardly where it is detected by microphone or "hydrophone" elements in a streamer towed by the vessel to yield information regarding characteristics of the underwater material and structures.

A towed streamer comprises a plurality of pressure-sensitive hydrophone elements enclosed within a waterproof jacket and electrically coupled to recording equipment onboard the vessel. Each hydrophone element within the streamer is designed to convert the mechanical energy present in pressure variations surrounding the hydrophone element into electrical signals. Due to its often extreme length (on the order of kilometers), the streamer is divided into a number of separate sections or "modules" that can be decoupled from one another and that are individually waterproof. Individual streamers can be towed in parallel through the use of paravanes to create a two dimensional array of hydrophone elements. Data buses running through each of the modules in the streamer carry the signals from the hydrophone elements to the recording equipment (so-called "acoustic data").

The individual hydrophone elements are preferably electrically coupled to one another to act in concert as a single sensor distributed along the length of each module. The individual signals of the hydrophone elements in the group are combined to produce a single group signal.

The single group signal may be thought of as emanating from a single, hypothetical hydrophone unit placed in the midst of the group of hydrophones. The location of the hypothetical hydrophone is called the "group center" of the group. Thus, when one speaks of a hydrophone array, one is often actually referring to an array of hypothetical hydrophones existing at group centers of actual groups of individual hydrophone elements.

The placement of each hydrophone in a group determines the location of each group center. It is important, for data analysis purposes, that the group centers be regularly spaced. The prior art has assumed that the individual hydrophones must likewise be regularly spaced. Occasionally, this results in a hydrophone being placed proximate a source of acoustic interference that interferes with operation of the hydrophone element and, thus, the group as a whole. It is very important that interference be reduced as much as possible, because pressure variations carrying actual acoustic data are minute. It is therefore desirable overall to reduce interference to the hydrophone elements in a module. Interference is a special concern in reduced diameter (on the order of 2") streamers.

Accordingly, what is needed in the art are construction practices for hydrophone modules that decrease the amount of interference that the hydrophones therein experience. More specifically, there is a need in the art for techniques for relocating individual hydrophones and otherwise decreasing noise in a hydrophone module.

SUMMARY OF THE INVENTION

To address the above-discussed deficiencies of the prior art, it is a primary object of the present invention to provide a module for a towed array having the flexibility to relocate individual hydrophone elements therein to minimize interference thereto and to reduce noise in the module in general.

In the attainment of the above primary object, the present invention provides a hydrophone module for a towed hydrophone array. The module comprises: (1) an elongated hydrophone module housing having a desired hydrophone group center associated therewith and (2) a plurality of hydrophone elements located substantially aperiodically along a length of the housing and electrically coupled together in a hydrophone group, the hydrophone group having an actual hydrophone group center proximate the desired hydrophone group center to thereby allow locations of the plurality of hydrophone elements to be altered without dislocating the actual hydrophone group center. Individual hydrophone elements within the group may therefore be moved within the module without disturbing the actual hydrophone group center.

"Hydrophone group center" is hereby defined as the place a hypothetical single hydrophone element would have to be located were the hypothetical element to replace the hydrophone group as a whole. Electrically, the hydrophone group is treated as a single distributed sensor. The effective center of the group is is the hydrophone group center. The hydrophone group center is quite analogous to a "center of mass" or "center of gravity" wherein, if the hydrophone elements were equal masses distributed along a lever arm, the center of mass or gravity would lie at the same location as the hydrophone group center.

The present invention is the first to recognize that individual hydrophone elements may be moved relative to the group center without moving the group center itself. It is important, however, that any move of a hydrophone element be counterbalanced with another such move, such that the net effect of the move as a whole does not dislocate the group center.

In a preferred embodiment of the present invention, separate signals from the plurality of hydrophone elements are electrically combined to form a single effective signal. Thus, the hydrophone elements cooperate to form a group.

In a preferred embodiment of the present invention, the module further comprises communication circuitry located along a length of the module housing and an external device coupled to an exterior of the module housing proximate the communication circuitry, the external device capable of generating interference in proximate ones of the plurality of hydrophone elements, the locations of the plurality of hydrophone elements alterable away from the external device to thereby avoid generation of the interference. In this embodiment, it is desired to move the hydrophones away from the interference-generating external device. Of course, the move should be done without dislocating the group center. Thus, one or more hydrophone proximate the external device are moved away and other hydrophone elements (preferably substantially distant from the external device) are moved toward the external device. The net effect is a reduction of the overall interference.

In a preferred embodiment of the present invention, the external device is a bird, the bird capable of inductive communication with the communication circuitry. As will be described, a bird is a device for controlling a depth of the module. The bird accepts control signals from the communication circuitry, preferably taking the form of a coil.

In a preferred embodiment of the present invention, the module further comprises an external device coupled to an exterior of the module housing and an acoustic absorbent material located within the housing at locations axially displaced from the external device to thereby damp acoustic interference transmitted through the module housing from the external device. The acoustic absorbent material is preferably Sorbothane™, a commercially-available material. In a more preferred embodiment, the external device is a bird capable of inductive communication with communication circuitry located within the module housing. In a related, more preferred embodiment, the acoustic absorbent material is located proximate spacers within the module housing. This gives the absorbent material added support in the module housing.

In a preferred embodiment of the present invention, the module housing has a spaced-apart plurality of desired hydrophone group centers associated therewith. Thus, one module may have more than one group therein. In a preferred embodiment of the present invention, the module is coupled in mechanical series to a plurality of modules to form a hydrophone streamer.

In a preferred embodiment of the present invention, the module housing comprises a jacket surrounding and containing a foam and a fill fluid for maintaining the module at a substantially neutral buoyancy.

In a preferred embodiment of the present invention, the module further comprises a plurality of birds coupled to the module housing for regulating a depth of the module.

The foregoing has outlined rather broadly the features and technical advantages of the present invention so those of ordinary skill in the art will better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
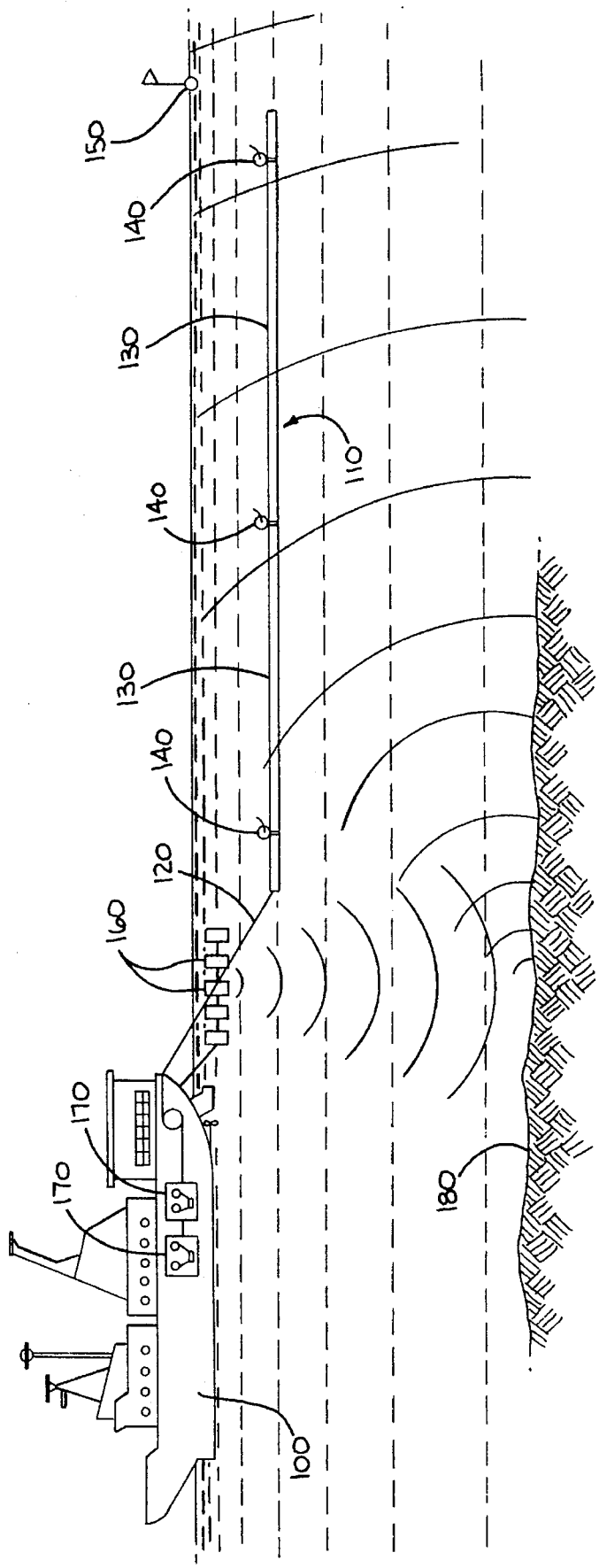
FIG. 1 illustrates an elevational view representing a towed array in operation.

Referring initially to FIG. 1, illustrated is an elevational view representing a towed array in operation. A seismic exploration vehicle 100 tows a streamer 110 behind it by way of a tow cable 120. The streamer 110 may comprise a rear buoy 150 if necessary. The streamer 110 is additionally provided with one or more leveling devices or "birds" 140 which serve to regulate the depth of the streamer 110 within the water. The seismic vessel also tows compressed air guns 160 or other sources of acoustic energy which generate an acoustic wave in the water which travels downwardly as shown, reflects at interfaces within the sea bed 180 and is detected by the hydrophones of the streamer 110. As described in more detail below, the analog signals generated by the hydrophones within the streamer 110 upon receipt of the reflected wave are converted to digital format by analog-to-digital converters also comprised in the streamer 110 and are transmitted in digital form along the streamer 110 and up the tow cable 120 to be recorded by digital recording devices 170 on board the ship 100. The streamer 110 comprises a plurality of modules 130. Each module 130 comprises a plurality of hydrophone assemblies (individually referenced in FIG. 2). The modules 130 are connectible to each other in various numbers to make the streamer 110 any length desired, up to a practical maximum length.

Figure 2:
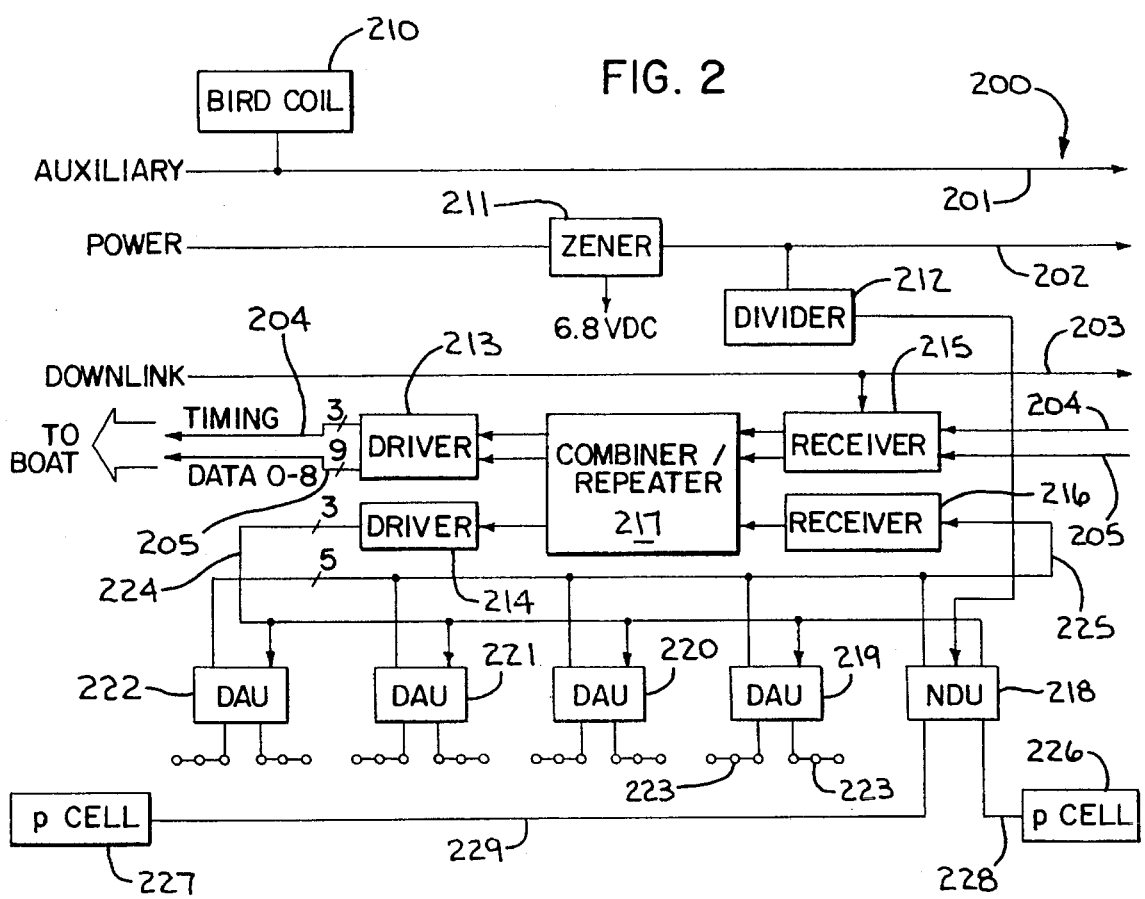
FIG. 2 illustrates a block diagram of an overall digital data system for a towed array module in the array of FIG. 1.

Turning now to FIG. 2, illustrated is a block diagram of an overall digital data system for a towed array module in the array of FIG. 1. A digital bus 200 is, in a preferred embodiment of the present invention, comprised of twisted-pair wire.

The bus 200 is divided into an auxiliary bus 201, a power bus 202, a downlink bus 203, a timing bus 204 and a combined acoustic/nonacoustic data bus 205. The auxiliary bus 201 is used, among other things to carry signals that are inductively transmitted to one of a plurality of birds (not shown) via a bird coil 210. Although the power bus 202 is a current bus and not a voltage bus, it nonetheless carries relatively high voltages (on the order of several hundred volts) at the front of the streamer 110. A zener diode 211 removes a portion of this voltage in each of the many modules within the array to provide, in a preferred embodiment, 6.8 volts to each module. Each of the separate housings in the module is provided with further voltage regulation. A divider 212 supplies this voltage to an input on a nonacoustic data unit ("NDU") 218 that embodies the data collection and relay circuit of the present invention. This allows the NDU 218 to detect whether the module is receiving sufficient power and to transmit an indication of the power level to the seismic exploration vehicle 100 of FIG. 1. For purposes of the present invention, nonacoustic data is defined as all data other than data acquired through the hydrophones. This includes temperature measurements, depth measurements, voltage measurements or NDU status information.

The downlink bus 203 receives downlink commands from the seismic exploration vehicle 100, delivering the downlink commands to various components within the array, including the NDU 218. The timing bus 204 carries synchronizing clock signals throughout each module in the array to allow the components therein to work in concert. The data bus 205 carries both the acoustic data derived from the hydrophones within the array and the nonacoustic data derived from nonacoustic sensors coupled to the NDU 218 in the form of interleaved packets. Data are arranged within the packets in an order representing the module order within the array.

The timing and data buses 204, 205 enter a receiver 215 where packets thereon (derived from modules behind the one shown) are buffered and transmitted therefrom into a combiner/repeater unit ("CRU") 217, serving to combine the packets with acoustic and nonacoustic data derived from the module shown (and buffered in a receiver 216) into revised packets. These revised packets are transmitted to the next module via a driver 213. The CRU 217 also feeds another driver 214 which serves to coordinate the operation of a plurality of acoustic data acquisition units ("DAUs") 219, 220, 221, 222 via a local timing bus 224. Each of the DAUs 219, 220, 221, 222 communicates with a plurality of hydrophones, representationally referenced as hydrophones 223. The output from the DAUs 219, 220, 221, 222 is fed to the receiver 216 for injection into the data stream of packets on the data bus 205 via a local data bus 225.

Also providing data to the receiver 216 is the NDU 218. The NDU 218 receives timing and downlink commands via the local timing bus 224 and supplies nonacoustic data to the receiver 216 via the local data bus 225. Again, the receiver 216 acts as a buffer for the data prior to entering the CRU 217 for injection into the main data stream. In addition to deriving local module voltage from the divider 212, the NDU 218 detects saltwater invasion via conductivity sensors ("Rho cells") 226, 227 via respective lines 228, 229. The drivers 213, 214, the receivers 215, 216, the CRU 217, the NDU 218 and the DAUs 219, 220, 221, 222 are housed in separate housings within and distributed throughout the module 130.

Figure 3:
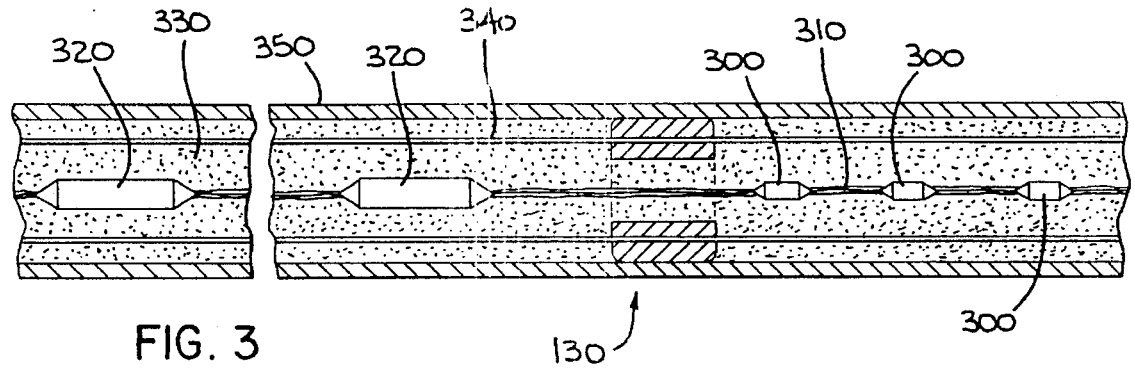
FIG. 3 illustrates a partial cross-sectional view of a typical module 130 of FIG. 1.

Turning now to FIG. 3, illustrated is a partial cross-sectional view of a typical module 130 of FIG. 1. The module 130 comprises a plurality of hydrophone assemblies 300 joined to each other by electrical cables 310. The electrical cables 310 feed into various data processing and transmission housings (such as digital data acquisition units and repeater units) 320 spread along a length of the module 130. An open-cell foam 330 and tension cables 340 reside within a waterproof jacket 350. The foam 330 laterally suspends the hydrophone assemblies 300 and the housings 320 therein and provides a surface suitable for longitudinally fixing the various housings 320 in a relatively stable spaced-apart relationship along the length of the module 130. Maintenance of this spaced-apart relationship is important to proper operation of the array because the phase of signals produced by the hydrophone array in response to pressure wave impingement is a function of hydrophone spacing.

The tension cables 340 are used to carry pulling forces generated by the towing vessel and transmitted down the towed array while it is under tow, thereby relieving the cables 310, the jacket 350 and other structures within the jacket 350 from this stress. A fill fluid having a certain desired specific gravity is entrained within the open cell foam 330. This fill fluid is chosen such that, when taken as a whole, the module has a certain desired specific gravity, preferably a neutral buoyancy with respect to sea water so as to minimize effort on the part of the "birds."

Traditionally, the entrained fill fluid is an aliphated hydrocarbon, although many other fluids have been considered. The specific gravity of the fill fluid is of primary concern. The fill fluid should also not materially attenuate the pressure wave impinging on the streamer 110. Finally, the fill fluid should be relatively chemically inert, such that the fluid does not harm components within the streamer 110. In a preferred embodiment of the present invention, the fill fluid is sold under the name NorPar 12™ and is an aliphated hydrocarbon.

Figure 4:
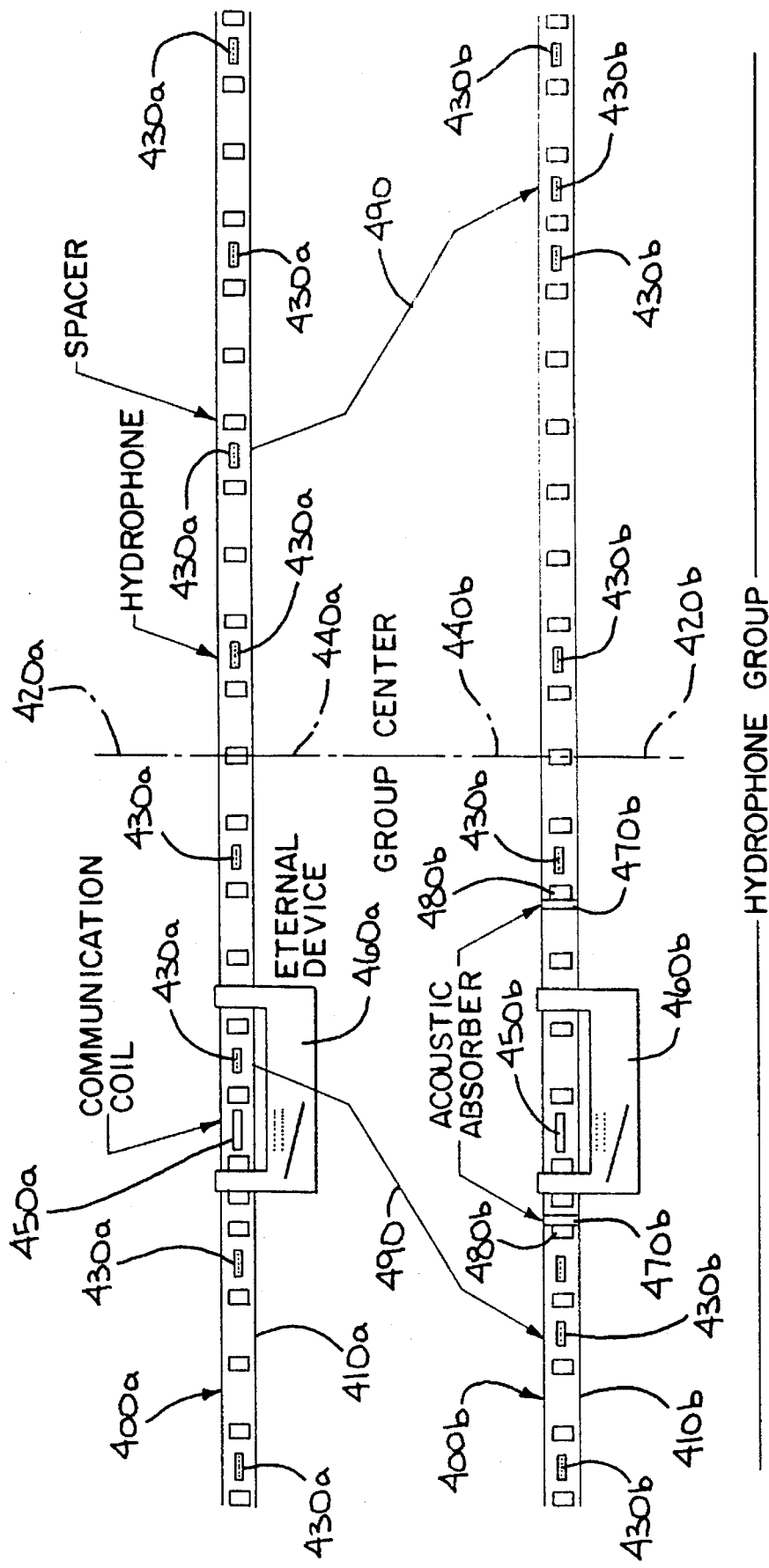
FIG. 4 illustrates a partial, schematic cross-sectional view of a prior art module alongside a module employing the quiet geophysical construction practices of the present invention.

Turning now to FIG. 4, illustrated is a partial, schematic cross-sectional view of a prior art module alongside a module employing the quiet geophysical construction practices of the present invention. The prior art module is designated 400a, and reference numerals associated with the prior art module all terminate with the letter "a." The module employing the quiet geophysical construction practices of the present invention is designated 400b, and reference numerals associated with the module employing the practices of the present invention all terminate with the letter "b" to avoid confusion The prior art module 400a comprises a module housing 410a having a desired group center 420a, a plurality of individual hydrophone elements 430a distributed periodically along a length of the housing 410a. The hydrophone elements 430a have an actual group center 440a. Communication circuitry 450a communicates with an external device 460a located external to the module housing 410a. A plurality of spacers 480a are located within the module housing 410a.

As previously described, as the module 400a is towed, fluid turbulence generated by the external device 460a causes interference to the hydrophone elements 430a, particularly to the hydrophone element 430a located in axial alignment with the external device 460a. Because the actual group center 440a cannot be moved from the desired group center 420a, the prior art has assumed that the hydrophone element 430a located in axial alignment with the external device 460a is nonmovable.

Again, it is a primary object of the present invention to provide a module for a towed array having the flexibility to relocate individual hydrophone elements therein to minimize interference thereto and to reduce noise in the module in general.

In the attainment of the above primary object, the present invention provides a hydrophone module 400b for a towed hydrophone array. The module 400b comprises: (1) an elongated hydrophone module housing 410b having a desired hydrophone group center 420b associated therewith and (2) a plurality of hydrophone elements 430b located substantially aperiodically along a length of the housing 410b and electrically coupled together in a hydrophone group. The hydrophone group has an actual hydrophone group center 440b proximate the desired hydrophone group center 420b to thereby allow locations of the plurality of hydrophone elements 430b to be altered without dislocating the actual hydrophone group center 440b. Individual hydrophone elements 430b within the group may therefore be moved within the module 400b without disturbing the actual hydrophone group center 440b.

Again, the present invention is the first to recognize that individual hydrophone elements 430b may be moved relative to the actual group center 440b without moving the actual group center 440b itself. It is important, however, that any move of a hydrophone element be counterbalanced with another such move, such that the net effect of the move as a whole does not dislocate the actual group center 440b.

In the illustrated embodiment, separate signals from the plurality of hydrophone elements 430b are electrically combined to form a single effective signal. Thus, the hydrophone elements 430b cooperate to form a group.

In the illustrated embodiment, the module 400b further comprises communication circuitry 450b located along a length of the module housing 410b and an external device 460b coupled to an exterior of the module housing 410b proximate the communication circuitry 450b. As previously mentioned, the external device 460b is capable of generating interference in proximate ones of the plurality of hydrophone elements 430b. The present invention allows the locations of the plurality of hydrophone elements 430b to be altered away from the external device 460b to thereby avoid generation of the interference. In this embodiment, it is desired to move the hydrophones 430b away from the interference-generating external device 460b.

In the illustrated embodiment, the external device 460b is a bird. The bird is capable of inductive communication with the communication circuitry 450b.

FIG. 4 particularly shows that ones of the hydrophone elements 430a have been moved (represented by arrows 490) to different locations (represented by the hydrophone elements 430b) along the length of the module 400b. This moves the hydrophones 430b away from the interference-generating external device 460b and substantially lowers interference and noise.

In the illustrated embodiment, the module 400b further comprises an acoustic absorbent material 470b located within the housing at locations axially displaced from the external device 460b to thereby damp acoustic interference transmitted through the module housing 410b from the external device 460b. The acoustic absorbent material 470b is preferably Sorbothane™, a commercially-available material. The acoustic absorbent material 470b is preferably located proximate spacers 480b within the module housing 410b. This gives the absorbent material 470b added support in the module housing 410b.

As previously mentioned, the module housing 410b may have a spaced-apart plurality of desired hydrophone group centers associated therewith. Thus, one module 400b may have more than one group therein.

From the above, it is apparent that the present invention provides a hydrophone module for a towed hydrophone array. The module comprises: (1) an elongated hydrophone module housing having a desired hydrophone group center associated therewith and (2) a plurality of hydrophone elements located substantially aperiodically along a length of the housing and electrically coupled together in a hydrophone group, the hydrophone group having an actual hydrophone group center proximate the desired hydrophone group center to thereby allow locations of the plurality of hydrophone elements to be altered without dislocating the actual hydrophone group center. Individual hydrophone elements within the group may therefore be moved within the module without disturbing the actual hydrophone group center.

Although the present invention and its advantages have been described in detail, those of ordinary skill in the art should understand that various changes, substitutions and alterations can be made herein without departing from the spirit and scope of the invention in its broadest form.

What is claimed is:

1. A hydrophone module, comprising:

an elongated hydrophone module housing having a desired hydrophone group center associated therewith;

a plurality of hydrophone elements located substantially aperiodically along a length of said housing and electrically coupled together in a hydrophone group, said hydrophone group having an actual hydrophone group center proximate said desired hydrophone group center to thereby allow locations of said plurality of hydrophone elements to be altered without dislocating said actual hydrophone group center; and communication circuitry located along a length of said module housing and an external device coupled to an exterior of said module housing and proximate to said communication circuitry, said external device capable of generating interference in proximate ones of said plurality of hydrophone elements, said locations of said plurality of hydrophone elements alterable away from said external device to thereby avoid said interference.

2. The module as recited in claim 1 further comprising a plurality of birds coupled to said module housing for regulating a depth of said module.

3. The module as recited in claim 1 wherein said external device is a bird, said bird capable of inductive communication with said communication circuitry.

4. The module as recited in claim 1 further comprising an external device coupled to an exterior of said module housing and an acoustic absorbent material located within said housing at locations axially displaced from said external device to thereby damp acoustic interference transmitted through said module housing from said external device.

5. The module as recited in claim 4 wherein said external device is a bird, said bird capable of inductive communication with communication circuitry located within said module housing.

6. The module as recited in claim 4 wherein said acoustic absorbent material is located proximate spacers within said module housing.

7. The module as recited in claim 1 wherein said module housing has a spaced-apart plurality of desired hydrophone group centers associated therewith.

8. The module as recited in claim 1 wherein said module is coupled in mechanical series to a plurality of modules to form a hydrophone streamer.

9. The module as recited in claim 1 wherein separate signals from said plurality of hydrophone elements are electrically combined to form a single effective signal.

10. The module as recited in claim 1 wherein said module housing comprises a jacket surrounding and containing a foam and a fill fluid for maintaining said module at a substantially neutral buoyancy.

* * * * *

UNITED STATES PATENT AND TRADEMARK OFFICE
CERTIFICATE OF CORRECTION

PATENT NO. : 5,579,286
DATED : November 26, 1996
INVENTOR(S) : Robert D. Skorheim It is certified that error appears in the above-indentified patent and that said Letters Patent is hereby corrected as shown below:

Col. 1, lines 27 and 28, "(WHTL-0005CIP)" should be --08/342,306

Col. 3, line 30, "is is" should be --is--.

Signed and Sealed this

Eighth Day of April, 1997

Attest:

BRUCE LEHMAN

Attesting Officer     Commissioner of Patents and Trademarks